US006825808B2

(12) United States Patent
Kimata et al.

(10) Patent No.: US 6,825,808 B2
(45) Date of Patent: Nov. 30, 2004

(54) ADAPTIVE ARRAY ANTENNA RECEIVING APPARATUS CAPABLE OF SHORTENING CONVERGENCE TIME OF ANTENNA WEIGHT

(75) Inventors: Masayuki Kimata, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 10/141,943

(22) Filed: May 10, 2002

(65) Prior Publication Data

US 2002/0190900 A1 Dec. 19, 2002

(30) Foreign Application Priority Data

May 11, 2001 (JP) ........................................ 2001-141357

(51) Int. Cl.[7] .............................. H01Q 3/24; H01Q 3/22; G01S 7/40
(52) U.S. Cl. ........................ 342/378; 342/165; 342/368
(58) Field of Search ................................ 342/165, 172, 342/174, 368, 375, 378, 380, 383; 343/853, 893; 375/147; 455/560, 561, 562

(56) References Cited

U.S. PATENT DOCUMENTS

| 4,316,191 A | * | 2/1982 | Sawatari et al. ............... 342/91 |
| 6,130,643 A | * | 10/2000 | Trippett et al. .............. 342/380 |
| 6,222,498 B1 | * | 4/2001 | Ishii et al. ................... 343/853 |
| 6,462,709 B1 | * | 10/2002 | Choi ............................ 342/378 |
| 6,486,828 B1 | * | 11/2002 | Cahn et al. ................... 342/363 |
| 2002/0171583 A1 | * | 11/2002 | Purdy et al. ................. 342/368 |

FOREIGN PATENT DOCUMENTS

| JP | 11-177474 A | 7/1999 |
| JP | 11-308130 A | 11/1999 |
| JP | 2000-40981 A | 2/2000 |
| JP | 2000-307489 A | 11/2000 |
| WO | WO 97/20400 A1 | 6/1997 |

OTHER PUBLICATIONS

H. Wang et al., "Adaptive Array Antenna Combined with Tapped Delay Line Using Processing Gain for Direct–Sequence/Spread–Spectrum Multiple Access System", IEICE Transactions, vol. J75–B11, No. 11; (1992), pp. 815–825.
S. Tanaka et al., "The Performance of Decision–Directed Coherent Adaptive Diversity in DS–CDMA Reverse Link", IEICE, Technical Report on Radio Communications System, (Nov. 1996), pp. RCS96–102 with Abstract.
R. Roy et al., "ESPRIT–Estimation of Signal Parameters Via Rotational Invariance Techniques, IEEE Transactions on Acoustics, Speech and Signal Processing", vol. 37, No. 7, (Jul. 1989), pp. 984–995 with Abstract.
R. o. Schmidt, "Multiple Emitter Location and Signal Parameter Estimation, IEEE Transactions on Antennas and Propagation", vol. AP–34, No. 3, (Mar. 1986), pp. 276–280 with Abstract.

* cited by examiner

Primary Examiner—John B. Sotomayor
Assistant Examiner—Isam Alsomiri
(74) Attorney, Agent, or Firm—Sughrue Mion, PLLC

(57) ABSTRACT

In an adaptive array antenna receiving apparatus, signal to interference ratio (SIR) measuring units are provided in signal processing units, respectively. The SIR measuring units measure signal to interference ratios of existing fingers to supply the measured results for an antenna weight succession processing unit. The antenna weight succession processing unit selects one of the existing fingers on the basis of the measured results. The antenna weight succession processing unit extracts antenna weights from one of the signal processing units that corresponds to the selected finger. The antenna weight succession processing unit supplies the extracted antenna weights to a newly assigned finger or one of the existing fingers that path timing is greatly changed.

15 Claims, 9 Drawing Sheets

ADAPTIVE ARRAY ANTENNA RECEIVING APPARATUS CAPABLE OF SHORTENING CONVERGENCE TIME OF ANTENNA WEIGHT

BACKGROUND OF THE INVENTION

This invention relates to an adaptive array antenna receiving apparatus, in particular, to an adaptive array antenna receiving apparatus for performing RAKE combining of a desired signal came through a plurality of paths (or a multi-path).

A code division multiple access (CDMA) system attracts attention as a radio transmitting system capable of considerably increasing a subscriber capacity. For example, a CDMA adaptive array antenna receiving apparatus used in the CDMVA system is disclosed in Wang et al "Adaptive Array Antenna Combined with Tapped Delay Line Using Processing Gain for Direct-Sequence/Spread-Spectrum Multiple Access System" (IEICE Transactions, Vol. J75-BII, No. 11, pp. 815–825, 1992) and Tanaka et al "The Performance of Decision-Directed Coherent Adaptive Diversity in DS-CDMA Reverse Link" (IEICE, Technical Report on Radio Communication System, RCS96–102, November 1996). As disclosed in these articles, antenna weights are controlled by the use of a weighting control error signal derived after despreading. In this manner, adaptive control is carried out so that an antenna directive pattern maximizing a received SIR (Signal to Interference Ratio) is formed to cancel an interference.

However, the CDMA adaptive array antenna receiving apparatus has a problem that it takes a long time to be converged antenna weights.

SUMMARY OF THE INVENTION

It is therefore an object of this invention to provide an adaptive array antenna receiving apparatus capable of shortening a convergence time of antenna weights.

Other object of this invention will become clear as the description proceeds.

According to an aspect of this inventions an adaptive array antenna receiving apparatus forms a beam for each path of a multipath. The adaptive array antenna receiving apparatus comprises an existing state detecting unit(s) to detect an existing state regarding existing fingers. An antenna weight succession processing unit is connected to the existing state detecting unit(s) and selects one of the existing fingers on the basis of the existing state. The antenna weight succession processing unit borrows antenna weights used for the selected existing finger to provide the borrowed antenna weights for a newly assigned finger or another one of the existing fingers that a path timing is changed.

According to another aspect of this invention, an adaptive array antenna receiving apparatus has a plurality of receiving antennas for receiving signals to produce received signals. A plurality of signal processing units processes assigned fingers corresponding to paths of a multipath for a desired signal. The signal processing units includes antenna weight adaptive controllers to individually control antenna weights used for weighting the received signals. The adaptive array antenna receiving apparatus comprises an existing state detecting unit(s) to detect an existing state regarding existing fingers. An antenna weight succession processing unit is connected to the existing state detecting unit(s) and the antenna weight adaptive controllers and selects one of the existing fingers on the basis of the existing state as a selected finger. The antenna weight succession processing unit extracts antenna weights from one of the antenna weight adaptive controllers that corresponds to the selected finger. The antenna weight succession processing unit supplies the extracted antenna weights as initial antenna weights for another one of the antenna weight adaptive controllers that corresponds to a newly assigned finger or to another one of the existing fingers that a path timing is changed.

According to still another aspect of this invention, a method is used in an adaptive array antenna receiving apparatus. The adaptive array antenna receiving apparatus has a plurality of receiving antennas for receiving signals to produce received signals. A plurality of signal processing units is for existing fingers corresponding to paths of a multipath for a desired signal. The signal processing units include antenna weight adaptive controllers to individually control antenna weights used for weighting the received signals. The method is for providing initial antenna weights for a newly assigned finger or a path timing changed finger. The method comprises the steps of detecting an existing state of the existing fingers, selecting one of the existing fingers as a selected finger on the basis of the existing state, extracting the antenna weights from one of the signal processing units that corresponds to the selected finger, and providing the extracted antenna weights to the newly existing finger or the path timing changed finger.

DESCRIPTION OF THE PREFERRED EMBODIMENTS

Referring to FIGS. 1 through 4, description will be at first directed to a related CDMA adaptive array antenna receiving apparatus for a better understanding of this invention.

Figure 1:
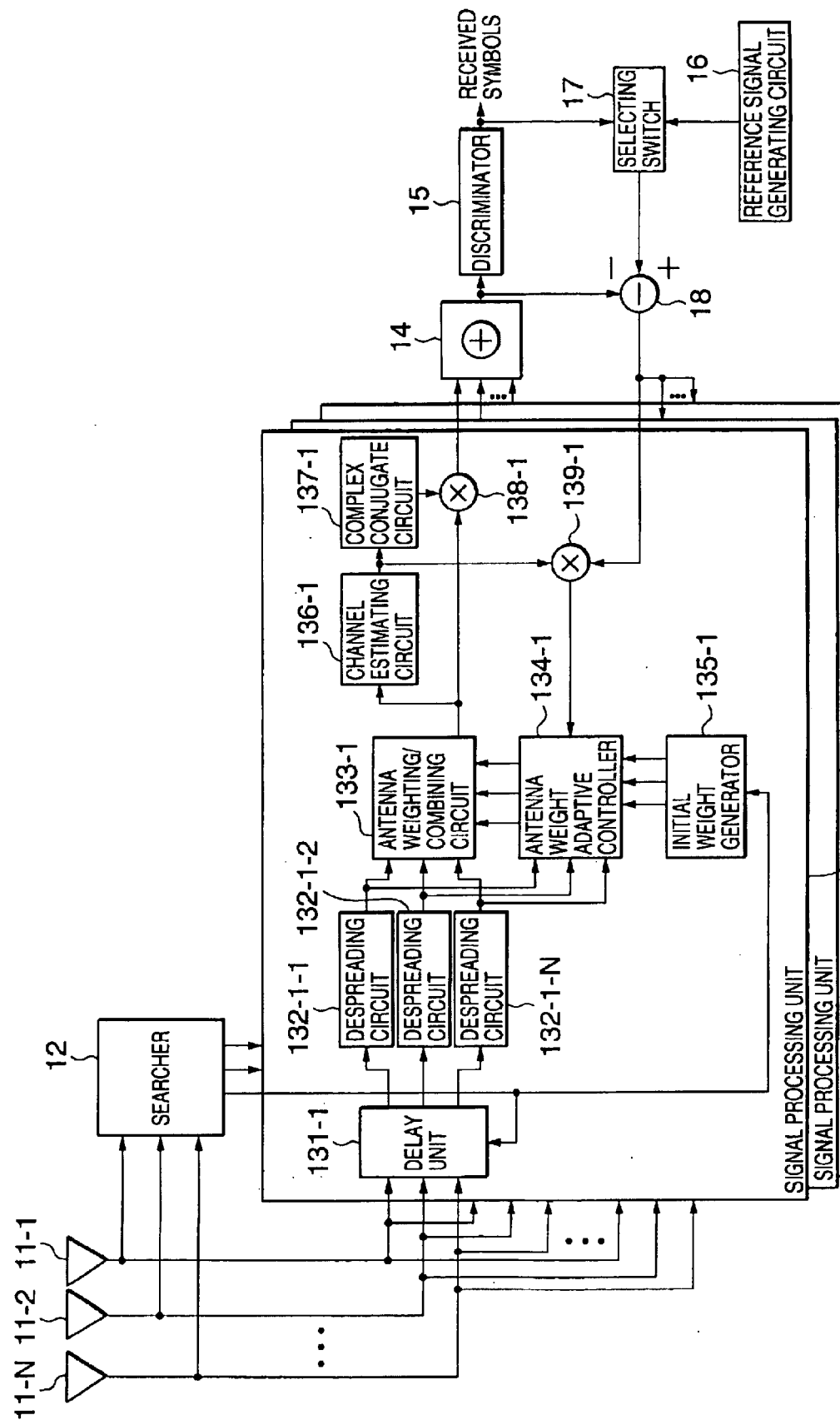
FIG. 1 is a block diagram showing a structure of a related CDMA adaptive array antenna receiving apparatus.

FIG. 1 is a block diagram showing an example of a structure of the related CDMA adaptive array antenna receiving apparatus. It is assumed here that the number of receiving antennas is equal to N (N being an integer not smaller than 2) and that the number of paths of a multipath is equal to L (L being an integer not smaller than 1). Consideration will be made about the k-th user (k being an integer not smaller than 1).

The CDMA adaptive array antenna receiving apparatus of FIG. 1 is corresponding to the k-th user. As illustrated in FIG. 1, the CDMA adaptive array antenna receiving apparatus comprises N receiving antennas 11-1 through 11-N forming an array antenna, a searcher 12, L signal processing units 13-1 through 13-L corresponding to the L paths of the multipath, an adder 14, a discriminator 15, a reference signal generating circuit 16, a selecting switch 17, and a subtracter 18.

The signal processing units 13-1 through 13-L corresponding to the L paths of the multipath have the same structure. The signal processing units 13-1 through 13-L comprise delay units 131-1 through 131-L, N despreading circuits 132-1-1 through 132-L-N, antenna weighting/combining circuits 133-1 through 133-L, antenna weight adaptive controllers 134-1 through 134-L, initial weight generators 135-1 through 135-L, channel estimating circuits 136-1 through 136-L, complex conjugate circuits 137-1 through 137-L, first multiplication circuits 138-1 through 138-L, and second multiplication circuits 139-1 through 139-L.

The searcher 12 detects delay times, which are corresponding to the L paths of the multipath respectively, by the use of signals received by the receiving antennas 11-1 through 11-N. The searcher 12 notifies both of the delay units 131-1 through 131-L and the initial weight generators 135-1 through 135-L of timing corresponding to the delay times of the L paths of the multipath. The timing of the delay time corresponding to each path of the multipath is set in the corresponding one of the delay units 131-1 through 131-L so as to be used for the receiving antennas 11-1 through 11-N commonly. This is because the receiving antennas 11-1 to 11-N are arranged in close proximity to one another so that the received signals are mutually correlated and thereby it can be assumed that the receiving antennas 11-1 through 11-N have the same delay profile.

The delay units 131-1 through 131-L individually serve to delay the signals received by the N receiving antennas 11-1 through 11-N for the L paths of the multipath. Hereby, the received signals are classified into the first through the L-th paths. The received signals output from the delay units 131-1 through 131-L are despread by the despreading circuits 132-1-1 through 132-L-N. The despread signals are supplied to the antenna weighting/combining circuits 133-1 through 133-L and the antenna weight adaptive controllers 134-1 through 134-L.

The initial weight generators 135-1 through 135-L individually generate initial weights and set the initial weights to the antenna weight adaptive controllers 134-1 through 134-L when a path is newly assigned by the searcher 12 or when path timing is greatly changed.

Figure 2:
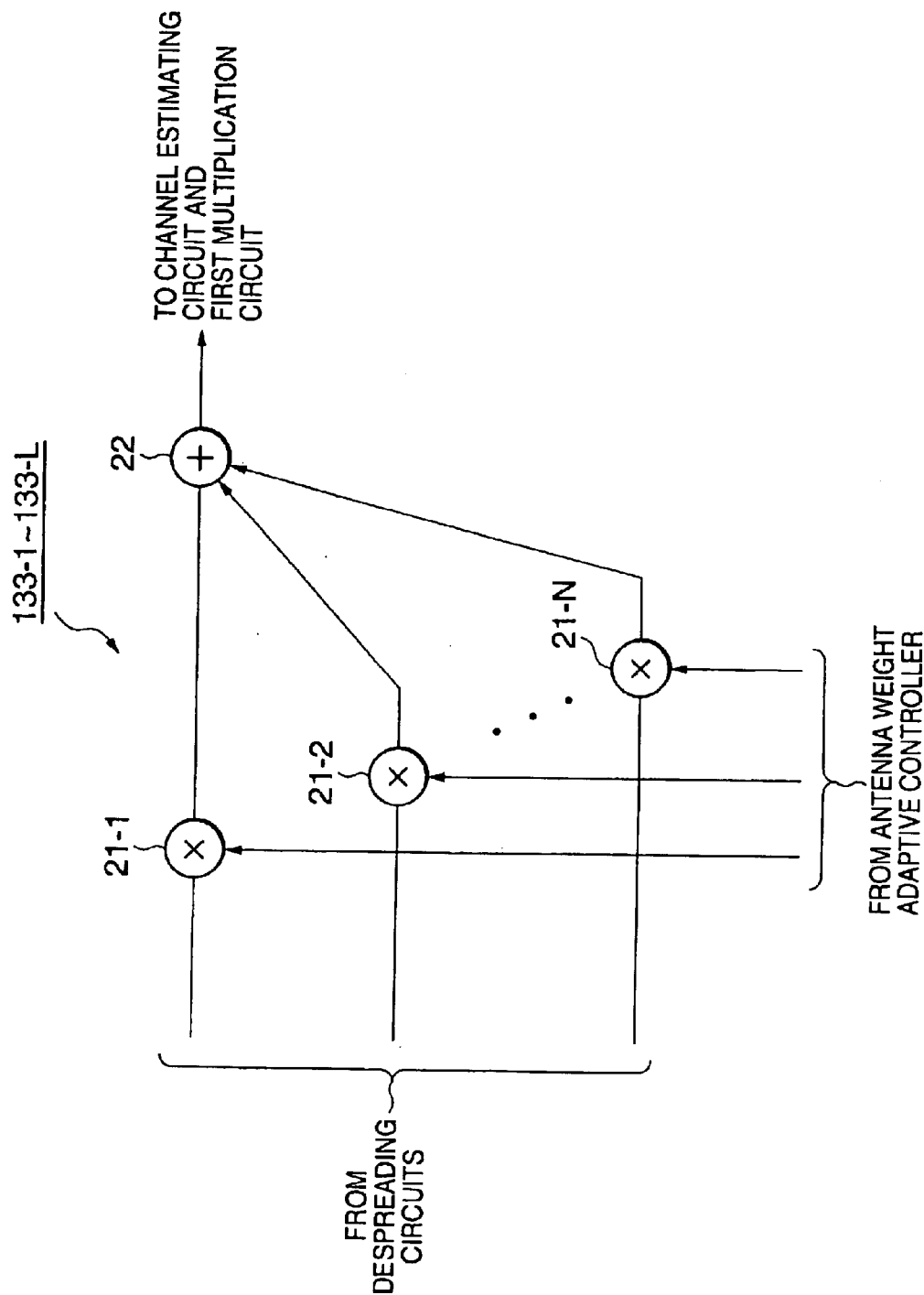
FIG. 2 is a block diagram of an antenna weighting/combining circuit used in the related CDMA adaptive array antenna receiving apparatus of FIG. 1.

FIG. 2 is a block diagram showing a structure of one of the antenna weighting/combining circuits.133-1 through 133-L. The antenna weighting/combining circuits 133-1 through 133-L have the same structure. Each of the antenna weighting/combining circuits 133-1 through 133-L comprises N multipliers 21-1 through 21-N and an adder 22.

For the convenience, the description is directed to the signal processing unit 13-1. The remaining signal processing units 13-2 through 13-L operate like the signal processing unit 13-1.

In the antenna weighting/combining circuit 133-1, the multipliers 21-1 through 21-N multiply the received signals despread by the despreading circuits 132-1-1 through 132-1-N by the antenna weights produced by the antenna weight adaptive controller 134-1. The adder 22 adds results of the multiplication of the multipliers 21-1 through 21-N to one another. Thus, the despread signals are weighted and combined in the antenna weighting/combining circuit 133-1. The weighted and combined signal is supplied to both of the channel estimating circuit 136-1 and the first multiplication circuit 138-1 as shown in FIG. 1. The antenna weighting/combining circuit 133-1 makes the array antenna have directive pattern, which has a large gain for a desired signal and which can suppress interference, by controlling amplitudes and phases of the received signals supplied from the receiving antennas 11-1 through 11-N.

Returning to FIG. 1, the channel estimating circuit 136-1 estimates channel distortion by the use of the output of the antenna weighting/combining circuit 133-1. The estimated channel distortion is supplied to both of the complex conjugate circuit 137-1 and the second multiplication circuit 139-1.

The complex conjugate circuit 137-1 produces a complex conjugate of the channel distortion estimated by the channel estimating circuit 136-1. The first multiplication circuit 138-1 multiplies the output of the antenna weighting/combining circuit 133-1 by the complex conjugate produced by the complex conjugate circuit 137-1 and thereby the channel distortion is compensated.

The adder 14 adds the output of the first multiplication circuit 138-1 to the outputs of the signal processing units 13-2 through 13-L and thereby the RAKE combining is made. The combined output of the adder 14 is supplied to both of the discriminator 15 and the subtracter 18.

The output of the discriminator 15 is not only output as received symbols of the k-th user but also supplied to the selecting switch 17 that provides it as a reference signal when another signal different from a known pilot signal is received.

The reference signal generating circuit 16 produces the known pilot signal.

The selecting switch 17 selects the output of the reference signal generating circuit 16 and supplies it to the subtracter 18 while a pilot signal is received. On the other hand, the selecting switch 17 selects the received symbols which are the output of the discriminator 15 to supply them to the subtracter 18 while the other signal different from the known pilot signal is received.

The subtracter 18 subtracts the RAKE combined output of the adder 14 from a reference signal which is the output of the selecting switch 17 to produce a common error signal. The second multiplication circuit 139-1 multiplies the common error signal by the channel distortion estimated by the channel estimating circuit 136-1. The result of the multiplication of the second multiplication circuit 139-1 is supplied to the antenna weight adaptive controller 134-1.

The antenna weight adaptive controller 134-1 controls the antenna weights to minimize the mean square of the common error signal. This control of the antenna weights is made by the use of the common error signal multiplied by the channel distortion with the second multiplication circuit 139-1 and the antenna receiving signals output from the despreading circuits 132-1-1 through 132-1-N. Here, an adaptive updating algorithm used in the antenna weighting adaptive controller 134-1 is, for example, a Least Mean Square (LMS) algorithm.

Figure 3:
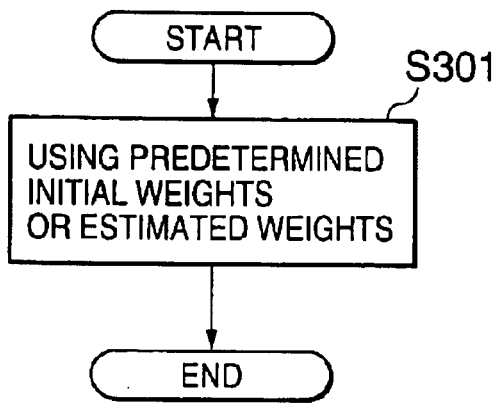
FIG. 3 is a flowchart for describing an operation of the CDMA adaptive array antenna receiving apparatus of FIG. 1 in a case where a finger is newly assigned.

FIG. 3 is a flowchart for describing an operation of the related CDMA adaptive array antenna receiving apparatus of FIG. 1 in a case where a finger (or path) is newly assigned. According to the flowchart in the case where the finger is newly assigned, the antenna weights generated by the corresponding one of the initial weight generators 135-1 through 135-L that corresponds to the newly assigned finger are set as the initial antenna weights in the corresponding one of the antenna weight adaptive controllers 134-1 through 134-L regardless of existing fingers (Step S301).

Figure 4:
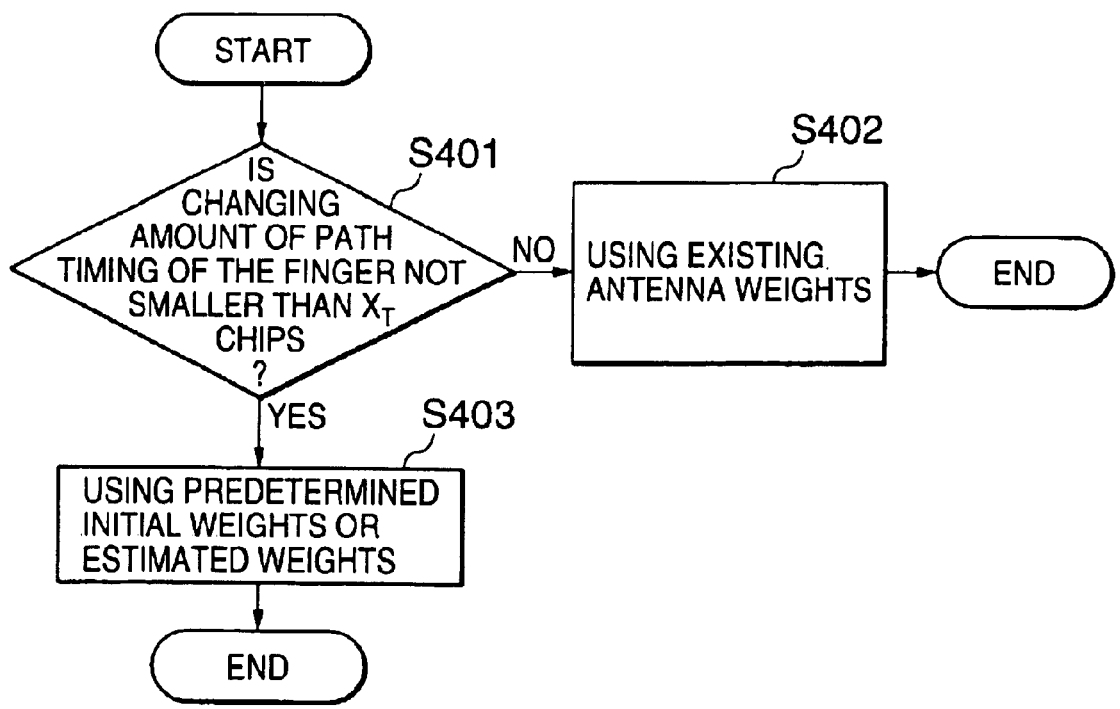
FIG. 4 is a flowchart for describing an operation of the CDMA adaptive array antenna receiving apparatus of FIG. 1 in a case where path timing of an existing finger is greatly changed.

FIG. 4 is a flowchart for describing an operation of the related CDMA adaptive array antenna receiving apparatus of FIG. 1 in a case where the path timing of the finger is greatly changed. Steps S401 and S402 of the flowchart in the case where the path timing of the finger is greatly changed are identical with steps S701 and S702 (see FIG. 7) of this invention. According to the flowchart, when the changing amount of the path timing of the finger is not smaller than $X_T$ chips, the antenna weights generated by the corresponding one of the initial weight generators 135-1 through 135-L are set as the initial antenna weights in the corresponding one of the antenna weight adaptive controllers 134-1 through 134-L (Step S403).

Two methods are well known as a deciding method for deciding the initial weights generated by the initial weight generators 135-1 through 135-L of the adaptive array antenna receiving apparatus. One of them is a method using predetermined initial weights such as non-directional weights. The other of them is a method using the initial weights estimated by the use of the signals received by the receiving antennas 11-1 through 11-N.

As the method using the initial weights estimated by the use of the signals received by the receiving antennas 11-1 through 11-N, some methods are known in the art. For instance, a method uses a result obtained by performing the channel estimates on the basis of the received signals. Another method uses a result obtained by estimating the direction of arrival of the desired signal by the use of the direction of arrival estimating algorithm such as MUSIC or ESPRIT. (MUSIC, for example, is disclosed in R. O. Schimidt "Multiple Emitter Location and Signal Parameter Estimation" (IEEE Trans. Vol. AP-34, No. 3, pp. 276–280, March 1986). ESPRIT, for example, is disclosed in R. Roy et al "ESPRIT-Estimation of Signal Parameters via Rotational Invariance Techniques" (IEEE Trans. Vol. ASSP-37, pp. 984–995, July 1989).) Still another method uses a result obtained by selecting a beam with high receiving quality from a multi-beam.

Figure 5:
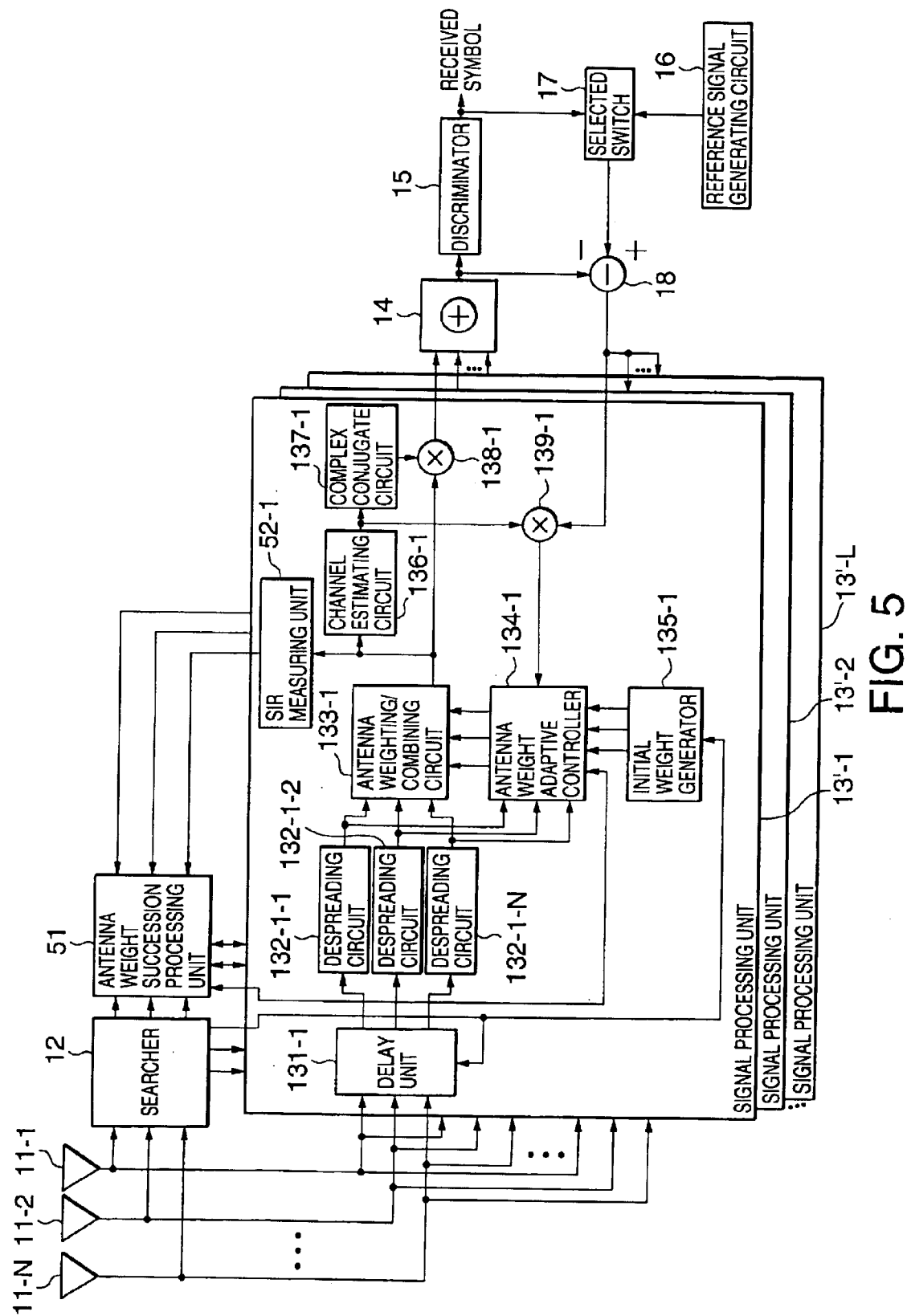
FIG. 5 is a block diagram of a CDMA adaptive array antenna receiving apparatus according to the first embodiment of this invention.
Figure 6:
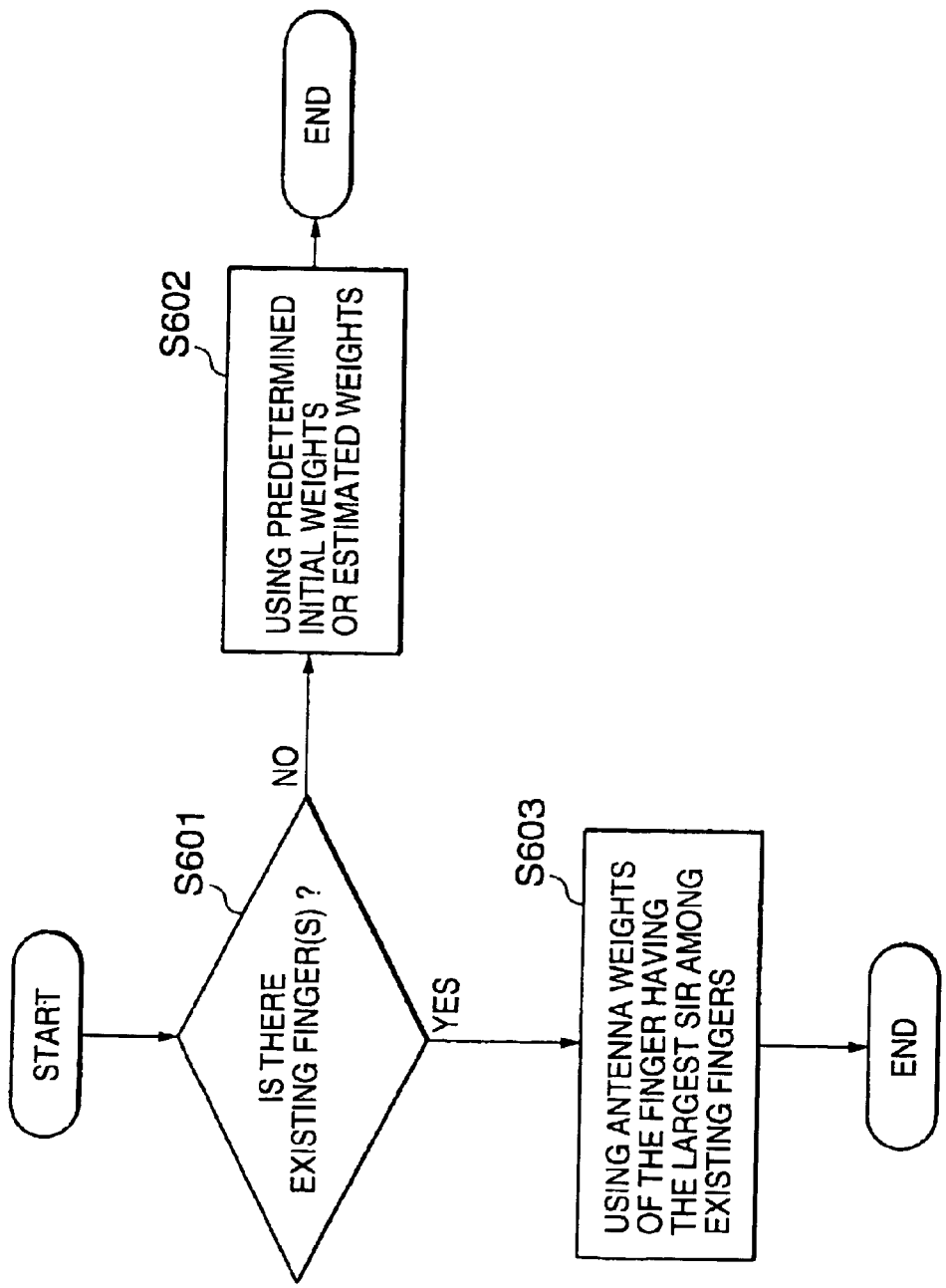
FIG. 6 is a flowchart for describing an operation of an antenna weight succession processing unit used in the CDMA adaptive array antenna receiving apparatus of FIG. 5 in a case where a finger is newly assigned.
Figure 7:
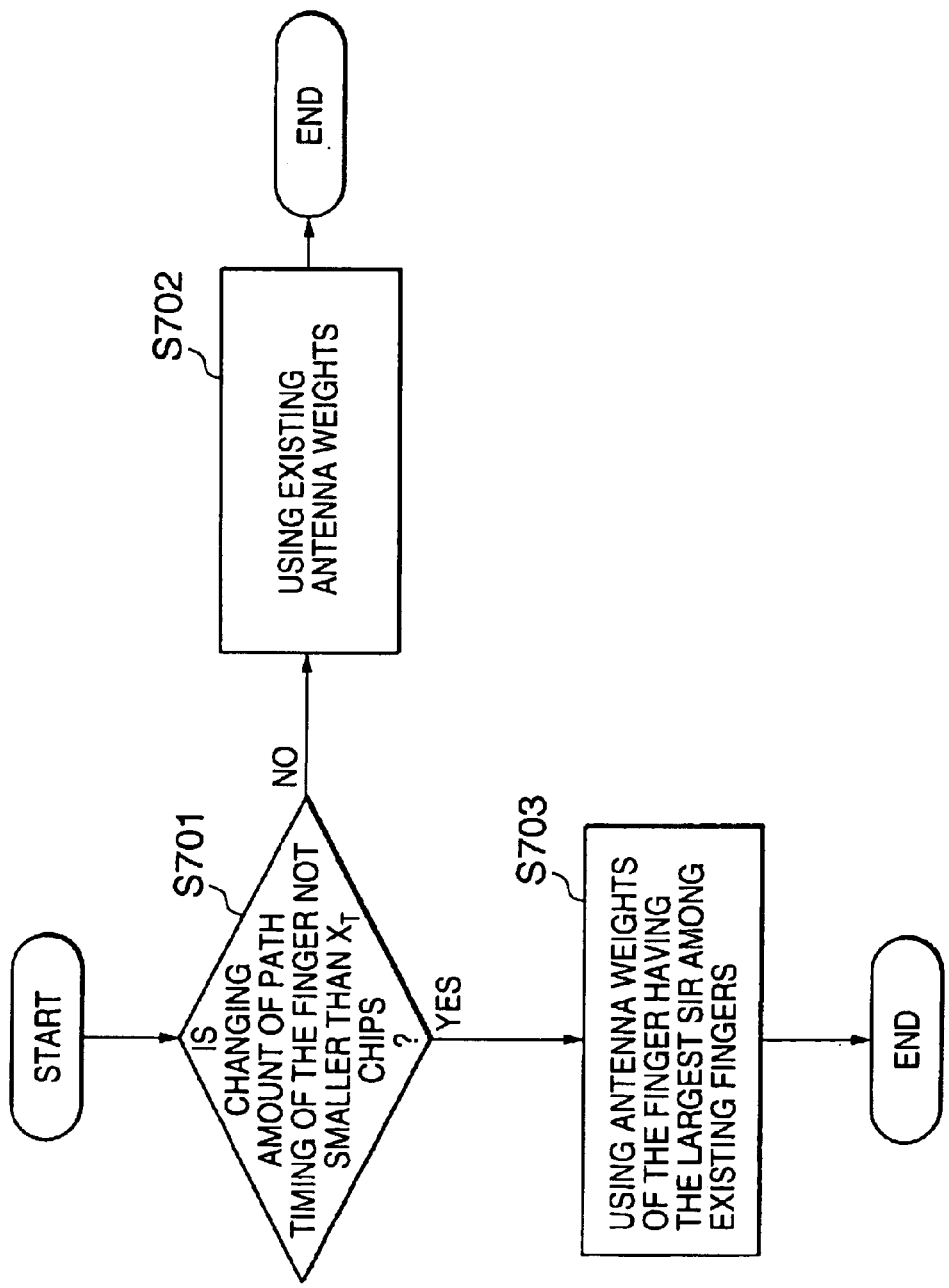
FIG. 7 is a flowchart for describing an operation of the antenna weight succession processing unit used in the CDMA adaptive array antenna receiving apparatus of FIG. 5 in a case where path timing of an existing finger is greatly changed.

Referring to FIGS. 5 through 7, the description will proceed to a CDMA adaptive array antenna receiving apparatus according to the first embodiment of this invention. Similar parts are designated by like reference numerals.

FIG. 5 is a block diagram showing a structure of the CDMA adaptive array antenna receiving apparatus. It is assumed here that the number of receiving antennas is equal to N (N being an integer not smaller than 2) and that the number of paths of a multipath is equal to L (L being an integer not smaller than 1). Consideration will be made about the k-th user (k being an integer not smaller than 1).

The CDMA adaptive array antenna receiving apparatus of FIG. 5 is corresponding to the k-th user. As illustrated in FIG. 5, the CDMA adaptive array antenna receiving apparatus comprises N receiving antennas 11-1 through 11-N forming an array antenna, a searcher 12, L signal processing units 13'-1 through 13'-L corresponding to the L paths of the multipath, an adder 14, a discriminator 15, a reference signal generating circuit 16, a selecting switch 17, a subtracter 18, and an antenna weight succession processing unit 51.

The signal processing units 13'-1 through 13'-L corresponding to the L paths of the multipath have the same structure. The signal processing units 13'-1 through 13'-L comprise delay units 131-1 through 131-L, N despreading circuits 132-1-1 through 132-L-N, antenna weighting/combining circuits 133-1 through 133-L, antenna weight adaptive controllers 134-1 through 134-L, initial weight generators 135-1 through 135-L, channel estimating circuits 136-1 through 136-L, complex conjugate circuits 137-1 through 137-L, first multiplication circuits 138-1 through 138-L, second multiplication circuits 139-1 through 139-L, and signal to interference ratio (SIR) measuring units 52-1 through 52-L.

The searcher 12 detects delay times, which are corresponding to the L paths of the multipath respectively, by the use of signals received by the receiving antennas 11-1 through 11-N. The searcher 12 notifies the delay units 131-1 through 131-L, the initial weight generators 135-1 through 135-L and the antenna weight succession processing unit 51 of timing corresponding to the delay times of the L paths of the multipath. The timing of the delay time corresponding to each path of the multipath is set in the corresponding one of the delay units 131-1 through 131-L so as to be used for the receiving antennas 11-1 through 11-N commonly. This is because the receiving antennas 11-1 to 11-N are arranged in close proximity to one another so that the received signals are mutually correlated and thereby it can be assumed that the receiving antennas 11-1 through 11-N have the same delay profile.

The delay units 131-1 through 131-L individually serve to delay the signals received by the N receiving antennas 11-1 through 11-N for the L paths of the multipath. Hereby, the received signals are classified into the first through the L-th paths. The received signals output from the delay units 131-1 through 131-L are despread by the despreading circuits 132-1-1 through 132-L-N. The despread signals are supplied to the antenna weighting/combining circuits 133-1 through 133-L and the antenna weight adaptive controllers 134-1 through 134-L.

The initial weight generators 135-1 through 135-L individually generate initial weights and set the initial weights to the antenna weight adaptive controllers 134-1 through 134-L.

The antenna weighting/combining circuits 133-1 through 133-L have the same structure as mentioned above. That is, each of the weighting/combining circuits 133-1 through 133-L comprises N multipliers 21-1 through 21-N and an adder 22 as illustrated in FIG. 2.

For the convenience, the description is directed to the signal processing unit 13'-1. The remaining signal processing units 13'-2 through 13'-L operate like the signal processing unit 13'-1.

In the antenna weighting/combining circuit 133-1, the multipliers 21-1 through 21-N multiply the received signals despread by the despreading circuits 132-1-1 through 132-1-N by the antenna weights produced by the antenna weight adaptive controller 134-1. The adder 22 adds results of the multiplication of the multipliers 21-1 through 21-N to one another. Thus, the despread signals are weighted and combined in the antenna weighting/combining circuit 133-1. The weighted and combined signal is supplied to the channel estimating circuit 136-1, the first multiplication circuit 138-1 and the SIR measuring unit 52-1 as shown in FIG. 5. The antenna weighting/combining circuit 1331 makes a beam corresponding to one of the paths of the multipath. That is, the antenna weighting/combining circuit 133-1 makes the array antenna have directive pattern, which has a large gain for a desired signal and which can suppress interference, by controlling amplitudes and phases of the received signal supplied from the receiving antennas 11-1 through 11-N.

The channel estimating circuit 136-1 estimates channel distortion by the use of the output of the antenna weighting/combining circuit 133-1. The estimated channel distortion is supplied to both of the complex conjugate circuit 137-1 and the second multiplication circuit 139-1.

The complex conjugate circuit 137-1 produces a complex conjugate of the channel distortion estimated by the channel estimating circuit 136-1. The first multiplication circuit 138-1 multiplies the output of the antenna weighting/combining circuit 133-1 by the complex conjugate produced by the complex conjugate circuit 137-1 and thereby the channel distortion is compensated.

The adder 14 adds the output of the first multiplication circuit 138-1 to the outputs of the signal processing units 13'-2 through 13'-L and thereby the RAKE combining is made. The combined output of the adder 14 is supplied to both of the discriminator 15 and the subtracter 18.

The output of the discriminator 15 is not only output as received symbols of the k-th user but also supplied to the selecting switch 17 that provides it as a reference signal when another signal different from a known pilot signal is received.

The reference signal generating circuit 16 produces the known pilot signal.

The selecting switch 17 selects the output of the reference signal generating circuit 16 and supplies it to the subtracter 18 while a pilot signal is received. On the other hand, the selecting switch 17 selects the received symbols which are the output of the discriminator 15 to supply them to the subtracter 18 while the other signal different from the known pilot signal is received.

The subtracter 18 subtracts the RAKE combined output of the adder 14 from a reference signal which is the output of the selecting switch 17 to produce a common error signal. The second multiplication circuit 139-1 multiplies the common error signal by the channel distortion estimated by the channel estimating circuit 136-1. The result of the multiplication of the second multiplication circuit 139-1 is supplied to the antenna weight adaptive controller 134-1.

The antenna weight adaptive controller 134-1 controls the antenna weights to minimize the mean square of the common error signal. This control of the antenna weights is made by the use of the common error signal multiplied by the channel distortion with the second multiplication circuit 139-1 and the antenna receiving signals output from the despreading circuits 132-1-1 through 132-1-N.

The SIR measuring units 52-1 through 52-L measure the signal to interference ratio (SIR) averaged in arbitrary time period by the use of the output of the antenna weighting/combining circuits 133-1 through 133-L. The SIR measuring units 52-1 through 52-L supply the measured result to the antenna weight succession processing unit 51. It is desirable that the arbitrary time period is approximately equal to a time constant of a loop of the adaptive updating algorithm used by the antenna weight adaptive controllers 134-1 through 134-L.

When the finger is newly assigned by the searcher 12 or when the path timing of any one of the existing fingers is greatly changed, the antenna weight succession processing unit 51 borrows or extracts the antenna weights from the corresponding one of the antenna weight adaptive controllers 134-1 through 134-L that is corresponding to the existing finger having the largest of the SIRs measured by the SIR measuring units 52-1 through 52-L. The extracted antenna weights are set in the corresponding one of the antenna weight adaptive controllers 134-1 through 134-L that is corresponding to the finger newly assigned or to the existing finger which the path timing is greatly changed. The reasons for using the antenna weights of the existing finger having the largest of the measured SIRs are that there is good possibility that the antenna weights causing good receiving quality (or strong path) have high accuracy.

The adaptive updating algorithm for the antenna weight adaptive controllers 134-1 through 134-L use either the antenna weights supplied from the antenna weight succession processing unit 51 or the antenna weights supplied from the initial weight generators 135-1 through 135-L as the initial antenna weights to carry out the adaptive updating.

Next, an operation of the CDMA adaptive array antenna receiving apparatus will be described with referring to FIGS. 5 through 7. Hereinafter, the antenna weight succession processing unit 51 will be especially described in detail.

Generally, under macro cell environment of land mobile communication, a radio wave emitted by a mobile station is reflected, diffracted and/or diffused by land and/or buildings around the mobile station and reaches a base station as the paths with about the same arrival angle. Accordingly, there are many cases where it is out of consideration to use the antenna weights of the existing finger as the initial antenna weights when the finger is newly assigned or when the path timing of the existing finger is greatly changed. According to this method, directivity with good receiving quality can be obtained immediately after starting of the adaptive updating. Furthermore, a convergence time, which is spent by the adaptive updating algorithm used in the corresponding one of the antenna weight adaptive controllers 134-1 Through 134-L, of the antenna weights, can be shortened. In addition, an amount of calculating in the corresponding one of the initial weight generators 135-1 through 135-L can be reduced.

FIG. 6 is a flowchart for describing an operation of the antenna weight succession processing unit 51 in a case where the finger is newly assigned. The antenna weight succession processing unit 51 detects assignment of a new finger on the basis of the timing notified from the searcher 12. When the finger is newly assigned, the antenna weight succession processing unit 51 judges whether the existing finger(s) exists or not (Step S601). This judgment is carried out by using outputs of the SIR measuring units 52-1 through 52-L. The outputs of the SIR measuring units 52-1 through 52-L represents an existing state of existing fingers.

If the existence of the existing fingers is not recognized, the antenna weight succession processing unit 51 notifies the antenna weight adaptive controller corresponding to the newly assigned finger of the absence of the existing fingers. The antenna weight adaptive controller corresponding to the newly assigned finger receives antenna weights from the initial weight generator corresponding to the newly assigned finger. In other words, antenna weights generated by the corresponding one of the initial weight generators 135-1 through 135-L that is corresponding to the newly assigned finger are set in the corresponding one of the antenna weight adaptive controllers 134-1 through 134L (Step 8602).

On the other hand, if the existence of the existing fingers is recognized, the antenna weight succession processing unit 51 extracts or borrows the antenna weights from the antenna weight adaptive controller of the finger having the largest of the SIRs measured by the SIR measuring units 52-1 through 52-L. The antenna weight succession processing unit 51 sets the extracted or borrowed antenna weights in the antenna weight adaptive controller corresponding to the newly assigned finger. In other words, the extracted antenna weights are set as the initial antenna weights in the corresponding one of the antenna weight adaptive controllers 134-1 through 134-L that is corresponding to the finger newly assigned (Step S603).

FIG. 7 is a flowchart for describing an operation of the antenna weight succession processing unit 51 in a case where the path timing of one of the existing fingers is greatly changed. The antenna weight succession processing unit 51 detects change of path timing of any one of the existing fingers on the basis of the timing supplied from the searcher 12. When the change of path timing is detected, the antenna weight succession processing unit 51 judges whether an amount of the change is not smaller than $X_T$ chips or not (Step S701). If the changing amount is smaller than $X_T$ chips, the antenna weight succession processing unit 51 do nothing. Accordingly, the antenna weights of the corresponding one of the antenna weight adaptive controllers 134-1 through 134-L that is corresponding to the path timing changed finger are continuously used (Step S702). This is because the smaller changing amount shows that the finger continuously exists.

On the other hand, if the changing amount is not smaller than $X_T$ chips, the antenna weight succession processing unit 51 extracts the antenna weights from the antenna weight adaptive controller corresponding to the finger having the largest of the SIRs measured by the SIR measuring units 52-1 through 52-L. The antenna weight succession processing unit 51 sets the extracted antenna weights as the initial antenna weights in the corresponding one of the antenna weight adaptive controllers 134-1 through 134-L that is corresponding to the path timing changed finger (Step S703).

As mentioned above, the antenna weights of the selected existing finger is used as the initial antenna weight in this embodiment when the new finger is newly assigned or when the path timing of any one of the existing fingers is greatly changed. Therefore, the directivity with the good receiving quality can be obtained immediately after the starting of the adaptive updating. Furthermore, the convergence time, which is spent by the adaptive updating algorithm used in the corresponding one of the antenna weight adaptive controllers 134-1 through 134-L, can be shortened. In addition, the amount of the calculating in the corresponding one of the initial weight generators 135-1 through 135-L can be reduced.

In the above mentioned embodiment, the outputs of the antenna weighting/combining circuits 133-1 through 133-L are used as selecting standards to obtain the antenna weights for the newly assigned finger or the path timing changed finger as good as possible while the existing finger having the largest of the SIRs is selected. However, the finger having the largest signal power may be selected by the antenna weight succession processing unit 51.

Figure 8:
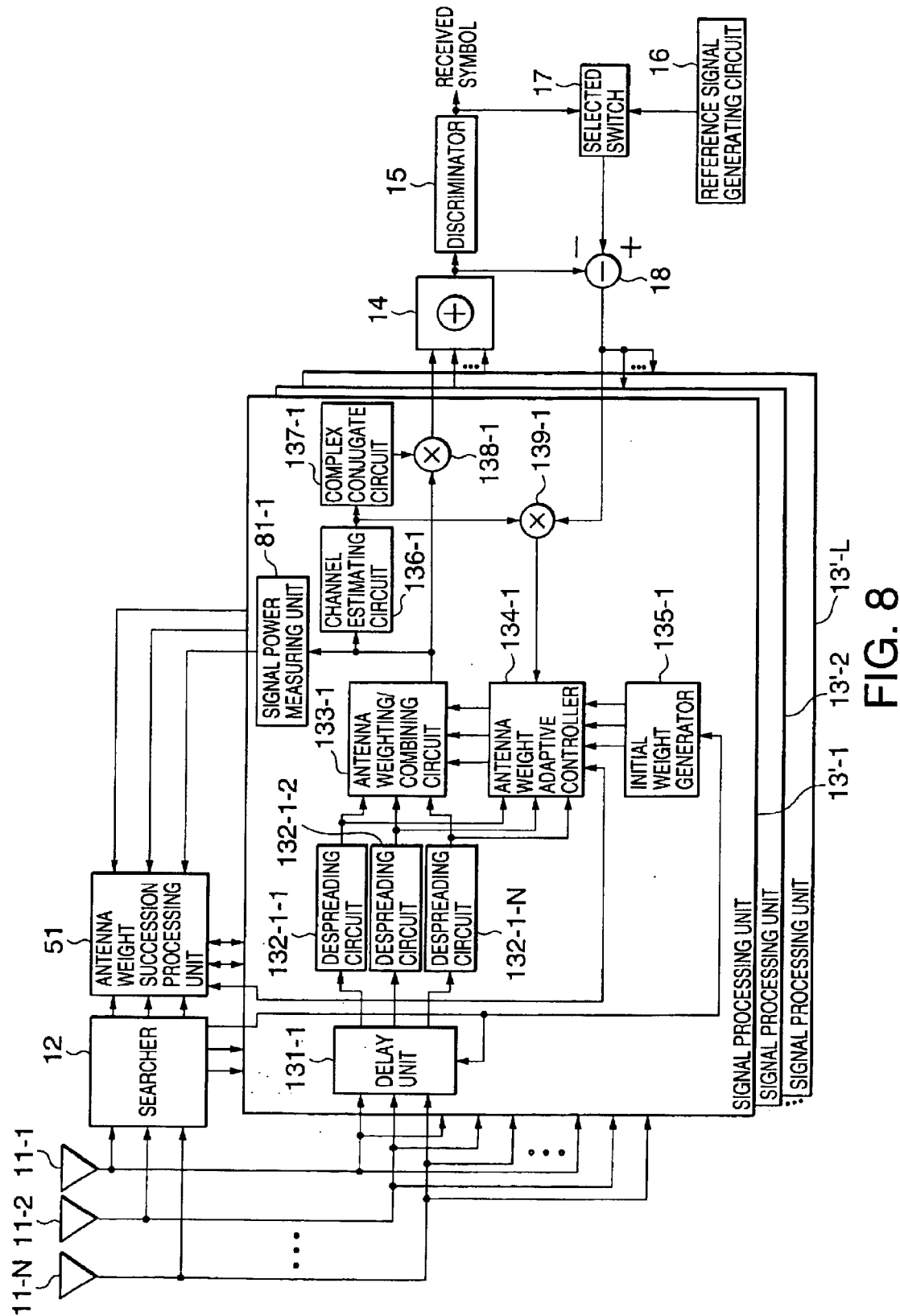
FIG. 8 is a block diagram of a CDMA adaptive array antenna receiving apparatus according to the second embodiment of this invention.

FIG. 8 is a block diagram showing a structure of a CDMA adaptive array antenna receiving apparatus, which adopts the method that the finger having the largest signal power is selected, according to the second embodiment of this invention.

Signal power measuring units 81-1 through 81-L use the outputs of the antenna weighting/combining circuits 133-1 through 133-L like the SIR measuring units 52-1 through 52-L of FIG. 5 and measure the signal power averaged in arbitrary time period to supply the measured results to the antenna weight succession processing unit 51. The average signal power is representative of the existing state of the existing fingers.

Furthermore, the existing finger having the largest gain in the direction of arrival of the signal or having the largest norm of the antenna weights may be selected by the weight succession processing unit 51. The weight succession processing unit 51 directly uses the antenna weights of the antenna weight adaptive controllers 134-1 through 134-L to select the existing finger having the largest gain in the direction of arrival of the signal or having the largest norm of the antenna weights.

Figure 9:
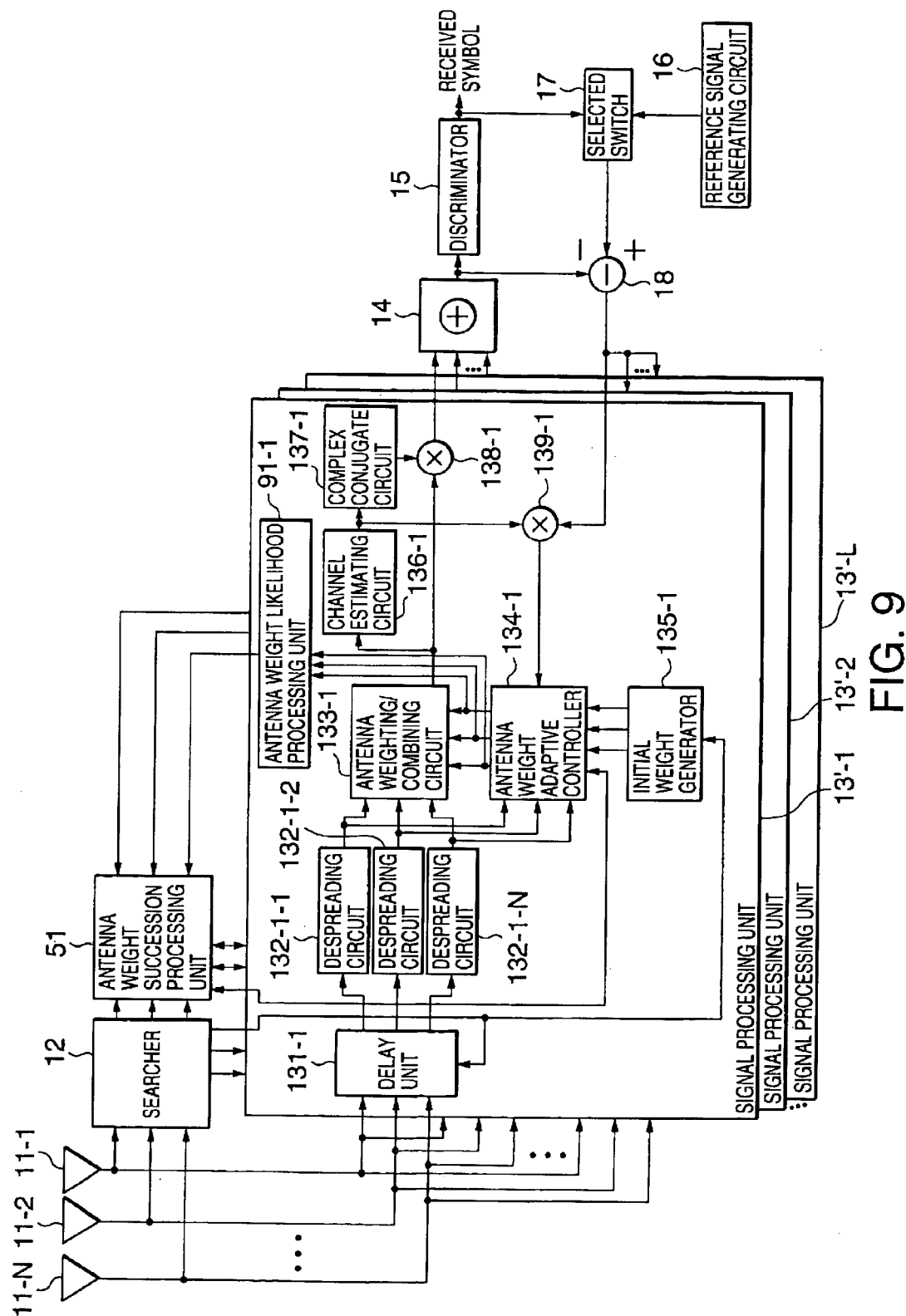
FIG. 9 is a block diagram of a CDMA adaptive array antenna receiving apparatus according to the third embodiment of this invention.

FIG. 9 is a block diagram showing a structure of a CDMA adaptive array antenna receiving apparatus, which adopts the method that the finger having the largest gain regarding the direction of arrival of the signal or having the largest norm of the antenna weights is selected, according to the third embodiment of this invention.

In a case where the method that the finger having the largest gain regarding the direction of arrival of the signal is selected is adapted, antenna weight likelihood processing units 91-1 through 91-L measure the gains in the direction of arrival of the signals averaged in arbitrary time period by the use of the antenna weights of the antenna weight adaptive controllers 134-1 through 134-L individually and supply the measured results to the antenna weight succession processing unit 51. The measured results represent the existing state of the existing fingers.

In a case where the method that the finger having the largest norm of the antenna weights is selected is adapted, the antenna weight likelihood processing units 91-1 through 91-L measure the norms averaged in arbitrary time period by the use of the antenna weights of the antenna weight adaptive controllers 134-1 through 134-L individually and supply the measured results to the antenna weight succession processing unit 51. The measured results represent the existing state of the existing fingers.

In addition, the existing finger having the shortest path timing or having the longest path duration may be selected by the antenna weight succession processing unit 51. The antenna weight succession processing unit 51 uses the timing notified from the searcher 12 to select the existing finger having the shortest path timing or having the longest path duration. The finger having the shortest path timing has possibility of being a direct wave with the high received level.

Figure 10:
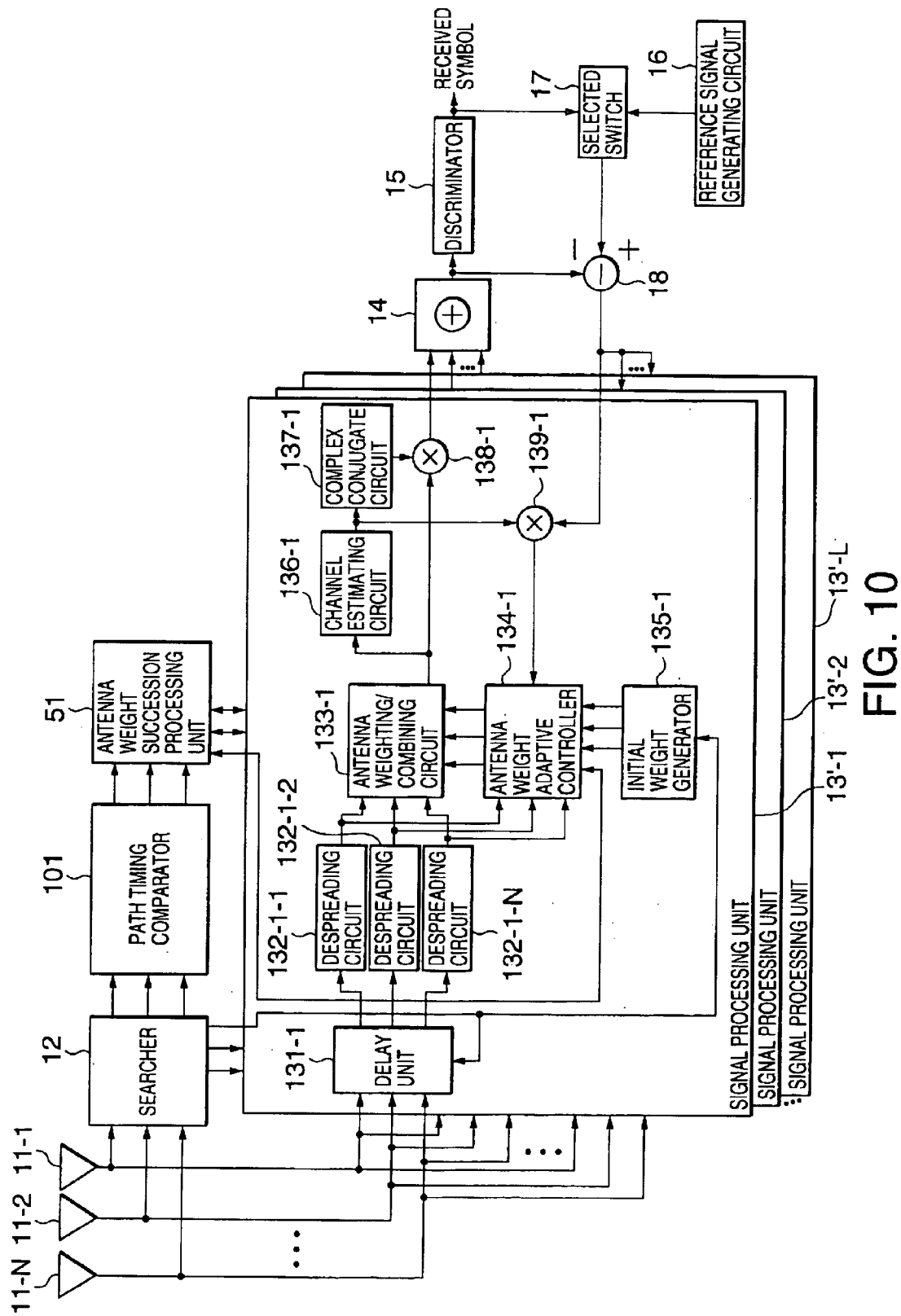
FIG. 10 is a block diagram of a CDMA adaptive array antenna receiving apparatus according to the fourth embodiment of this invention.

FIG. 10 is a block diagram showing a structure of a CDMA adaptive array antenna receiving apparatus, which adopts the method that the finger having the shortest path timing or having the longest path duration is selected, according to the fourth embodiment of this invention.

In a case where the method that the finger having the shortest path timing is selected is adapted, a path timing comparator 101 informs the antenna weight succession processing unit 51 of the path timing supplied from the searcher 12.

The path timing is representative of the existing state of the existing fingers.

In a case where the method that the finger having the longest path duration is selected is adapted, the path timing comparator 101 measures path duration and supply the measured results to the antenna weight succession processing unit 51. The measured results represent the existing state of the existing fingers.

While this invention has thus far been described in conjunction with the preferred embodiments thereof, it will readily be possible for those skilled in the art to put this invention into practice in various other manners. For example, this invention may be applied to another system, such as a time division multiple access (TDMA) system, a frequency division multiple access (FDMA) system or the like, that is different from the CDMA system and capable of separating a plurality of arrival waves. Furthermore, another adaptive updating algorithm such as a recursive least square (RLS) algorithm, a sample matrix inversion (SMI) algorithm or the like may be used in each of the antenna weight adaptive controllers 134-1 through 134-L.

What is claimed is:

1. An adaptive array antenna receiving apparatus which forms a beam for each path of a multipath, comprising:

existing state detecting means for detecting an existing state regarding existing fingers, and an antenna weight succession processing unit connected to said existing state detecting means for selecting one of said existing fingers on the basis of said existing state to borrow antenna weights used for the selected existing finger and to provide the borrowed antenna weights for a newly assigned finger or another one of said existing fingers that a path timing is changed.

2. An adaptive array antenna receiving apparatus as claimed in claim 1, wherein said existing state detecting means detects signal to interference ratios of said existing fingers by the use of outputs of antenna weighting/combining circuits corresponding to said existing fingers respectively, said antenna weight succession processing unit selecting one of said existing fingers that has the largest of said signal to interference ratios as said selected existing finger, said antenna weight succession processing unit further providing said antenna weights used for said selected existing finger as the most reliable antenna weights for said newly assigned finger or the other one of said existing fingers that said path timing is changed.

3. An adaptive array antenna receiving apparatus as claimed in claim 1, wherein said existing state detecting means detects signal power of said existing fingers by the use of outputs of antenna weighting/combining circuits corresponding to said existing fingers respectively, said antenna weight succession processing unit selecting one of said existing fingers that has the largest of said signal power as said selected existing finger, said antenna weight succession processing unit further providing said antenna weights used for said selected existing finger as the most reliable antenna weights for said newly assigned finger or the other one of said existing fingers that said path timing is changed.

4. An adaptive array antenna receiving apparatus as claimed in claim 1, wherein said existing state detecting means detects gains regarding direction of arrival of signal of said existing fingers by the use of antenna weights supplied from antenna weight adaptive controllers corresponding to said existing fingers respectively, said antenna weight succession processing unit selecting one of said existing fingers that has the largest of said gains as said selected existing finger, said antenna weight succession processing unit further providing said antenna weights used for said selected existing finger as the most reliable antenna weights for said newly assigned finger or the other one of said existing fingers that said path timing is changed.

5. An adaptive array antenna receiving apparatus as claimed in claim 1, wherein said existing state detecting means detects norms of antenna weights of said existing fingers by the use of antenna weights supplied from antenna weight adaptive controllers corresponding to said existing fingers respectively, said antenna weight succession processing unit selecting one of said existing fingers that has the largest of said norms as said selected existing finger, said antenna weight succession processing unit further providing said antenna weights used for said selected existing finger as the most reliable antenna weights for said newly assigned finger or the other one of said existing fingers that said path timing is changed.

6. An adaptive array antenna as claimed in claim 1, wherein said existing state detecting means notifies said antenna weight succession processing unit of path timing supplied from a searcher, said antenna weight succession processing unit selecting one of said existing fingers that has the shortest delay time on the basis of said path timing, said antenna weight succession processing unit further providing said antenna weights used for said selected existing finger as the most reliable antenna weights for said newly assigned finger or the other one of said existing fingers that said path timing is changed.

7. An adaptive array antenna as claimed in claim 1, wherein said existing state detecting means detects path duration of said existing fingers by the use of path timing supplied from a searcher, said antenna weight succession processing unit selecting one of said existing fingers that has the longest of said path duration as said selected existing finger said antenna weight succession processing unit further providing said antenna weights used for said selected existing finger as the most reliable antenna weights for said newly assigned finger or the other one of said existing fingers that said path timing is changed.

8. An adaptive array antenna receiving apparatus which has a plurality of receiving antennas for receiving signals to produce received signals and a plurality of signal processing units for processing assigned fingers corresponding to paths of a multipath for a desired signal, said signal processing units including antenna weight adaptive controllers for individually controlling antenna weights used for weighting said received signals, said adaptive array antenna receiving apparatus comprising:

existing state detecting means for detecting an existing state regarding existing fingers; and an antenna weight succession processing unit connected to said existing state detecting means and said antenna weight adaptive controllers for selecting one of said existing fingers on the basis of said existing state as a selected finger and for extracting antenna weights from one of the antenna weight adaptive controllers that corresponds to said selected finger to supply the extracted antenna weights as initial antenna weights for another one of said antenna weight adaptive controllers that corresponds to a newly assigned finger or to another one of said existing fingers that a path timing is changed.

9. An adaptive array antenna receiving apparatus as claimed in claim 8, said signal processing units further comprising antenna weighting/combining circuits respectively, said existing state detecting means comprising signal to interference ratio measuring units provided in said signal processing units for measuring signal to interference ratios of said existing fingers to detect said existing state, wherein:

said antenna weight succession processing unit selects one of said existing fingers that has the largest of said signal to interference ratios as said selected finger.

10. An adaptive array antenna receiving apparatus as claimed in claim 8, said signal processing units further comprising antenna weighting/combining circuits respectively, said existing state detecting means comprising signal power measuring units provided in said signal processing units for measuring signal power of said existing fingers to detect said existing state, wherein:

said antenna weight succession processing unit selects one of said existing fingers that has the largest of said signal power as said selected finger.

11. An adaptive array antenna receiving apparatus as claimed in claim 8, said existing state detecting means comprising antenna weight likelihood processing units provided in said signal processing units respectively for measuring gains of said direction of arrival of signal by the use of antenna weights supplied from said antenna weight adaptive controllers to detect said existing state, wherein:

said antenna weight succession processing unit selects one of said existing fingers that has the largest of said gains as said selected finger.

12. An adaptive array antenna receiving apparatus as claimed in claim 8, said existing state detecting means comprising antenna weight likelihood processing units provided in said signal processing units respectively for measuring norms of antenna weights supplied from said antenna weight adaptive controllers to detect said existing state, wherein:

said antenna weight succession processing unit selects one of said existing fingers that has the largest of said norms as said selected finger.

13. An adaptive array antenna receiving apparatus as claimed in claim 8 further comprising a searcher connected to said receiving antennas and said signal processing units, said existing state detecting means comprising a path timing comparator connected to said searcher for notifying said path timing supplied from said searcher to said antenna weight succession processing unit instead of detecting said existing state, wherein:

said antenna weight succession processing unit selects one of said existing fingers that has the shortest of delay times represented by said path timing as said selected finger.

14. An adaptive array antenna receiving apparatus as claimed in claim 8 further comprising a searcher connected to said receiving antennas and said signal processing units, said existing state detecting means comprising a path timing comparator connected to said searcher for measuring path duration of said existing fingers to detect said existing state, wherein:

said antenna weight succession processing unit selects one of said existing fingers that has the longest of said path duration as said selected finger.

15. A method used in an adaptive array antenna receiving apparatus which has a plurality of receiving antennas for receiving signals to produce received signals and a plurality of signal processing units for existing fingers corresponding to paths of a multipath for a desired signal, said signal processing units including antenna weight adaptive controllers for individually controlling antenna weights used for weighting said received signals, said method being for providing initial antenna weights for a newly assigned finger or a path timing changed finger, the method comprising the steps of:

detecting an existing state of the existing fingers;

selecting one of said existing fingers as a selected finger on the basis of said existing state;

extracting said antenna weights from one of said signal processing units that corresponds to said selected finger; and providing the extracted antenna weights to said newly existing finger or said path timing changed finger.

* * * * *